(No Model.) 2 Sheets—Sheet 1.

A. MUIR.
CHUCK.

No. 441,071. Patented Nov. 18, 1890.

WITNESSES:
E. B. Bolton
E. L. Richards

INVENTOR:
Alfred Muir
By Richards
his Attorneys.

(No Model.) 2 Sheets—Sheet 2.

A. MUIR.
CHUCK.

No. 441,071. Patented Nov. 18, 1890.

WITNESSES:
E. B. Bolton
E. L. Richards

INVENTOR:
Alfred Muir
By Richards & R
his Attorneys.

UNITED STATES PATENT OFFICE.

ALFRED MUIR, OF MANCHESTER, ENGLAND.

CHUCK.

SPECIFICATION forming part of Letters Patent No. 441,071, dated November 18, 1890.

Application filed March 28, 1890. Serial No. 345,637. (No model.) Patented in England February 28, 1890, No. 3,191.

*To all whom it may concern:*

Be it known that I, ALFRED MUIR, a subject of the Queen of Great Britain, residing at Manchester, in the county of Lancaster, England, have invented a certain new and useful Improvement in Chucks, (for which I have obtained Letters Patent in Great Britain, No. 3,191, and bearing date February 28, 1890,) of which the following is a specification.

It is a common practice in engineering to make a taper hole in a machine-spindle, into which hole the taper shank of a mandrel or a cutting-tool—such as a drilling, boring, milling, or other tool—is fitted and secured.

To enable the taper shank of a tool to be held and released from the spindle, it is usual to cut a slot through the spindle, intersecting the taper hole at or near its end, into which slot the flat end of the shank of the tool projects. The tool is held by driving its taper shank into the conical hole in the spindle, or vice versa. To release the tool, a key or wedge is driven into the slot so as to bear upon the end of the shank and drive it out. Other well-known methods of holding and releasing the taper shanks are employed—as, for example, a cotter passing transversely through a slot in the spindle and a corresponding slot in the shank. There are many objections to these plans. Among others, it necessitates the shanks of the tools being of nearly uniform length. Again, in some cases the taper or partly taper and partly parallel hole in the machine-spindle must be extended to an inconvenient length, which necessitates shanks of the same inconvenient size in order to permit the wedge to be used to release the tool through the slot made for the purpose.

The chief object of my invention is to overcome these difficulties, and I accomplish this by means of the improved tool holding and releasing appliance illustrated by the accompanying sheet of drawings, in which—

Figure 1:
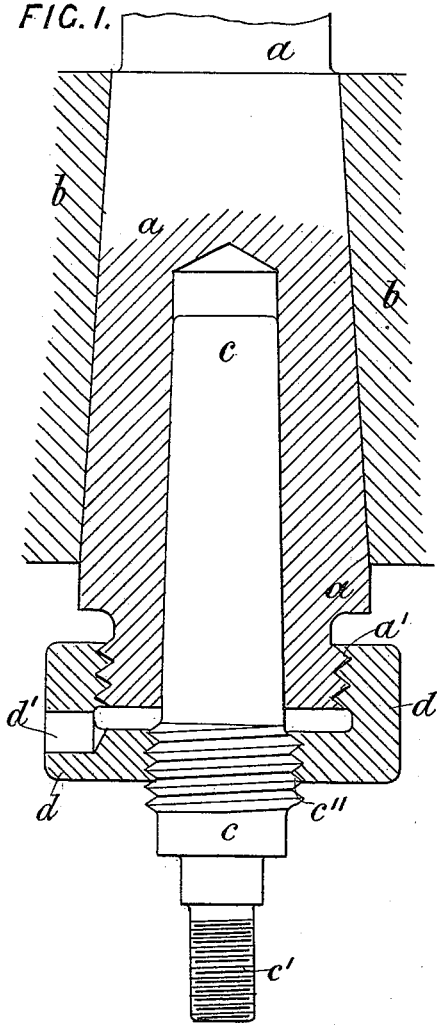
Figure 3:
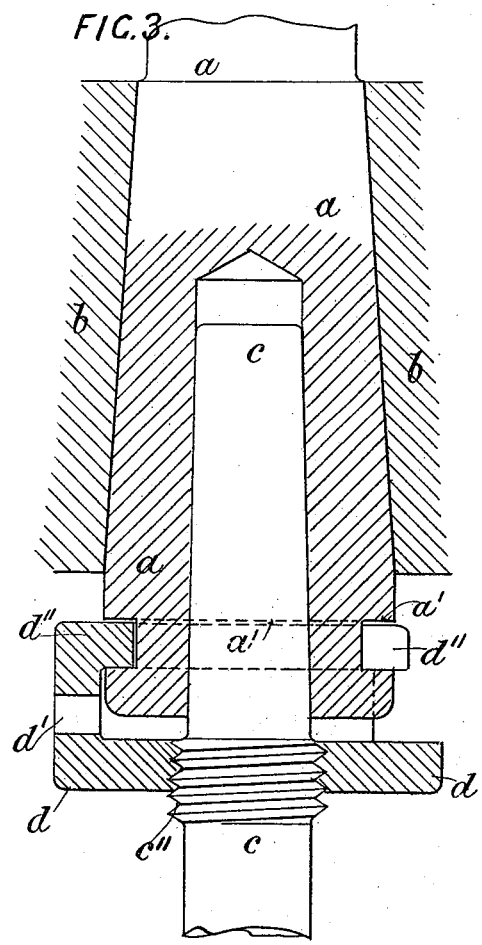
Figure 2:
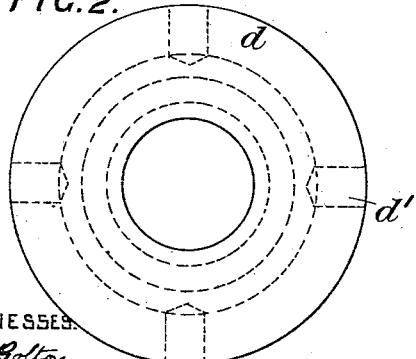
Figure 4:
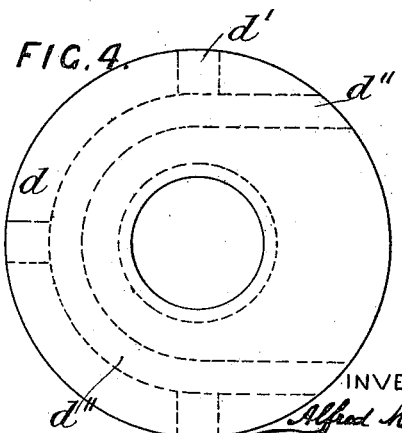
Figure 5:
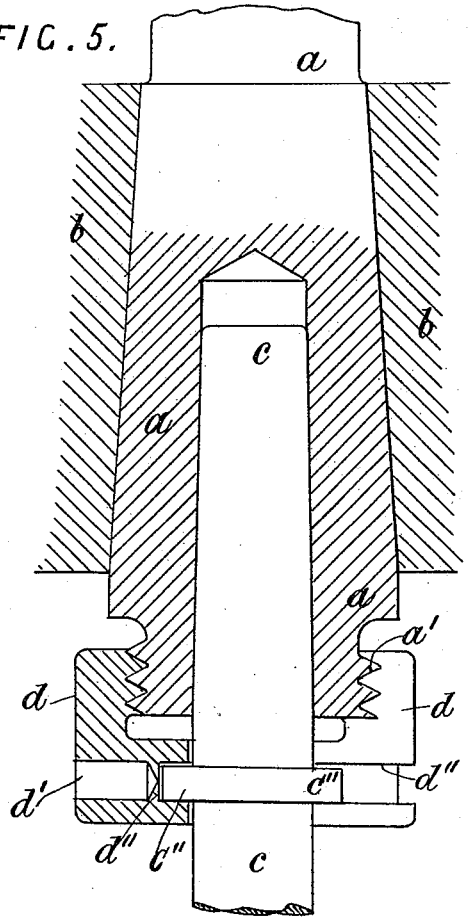
Figure 6:
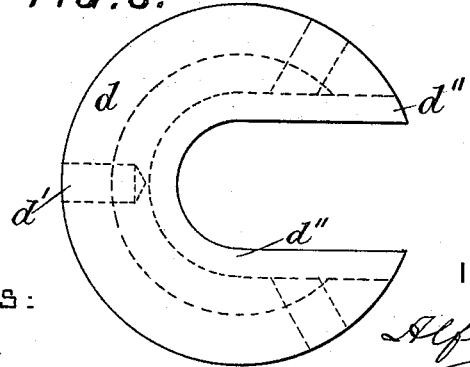

Figure 1 is a sectional elevation of part of the spindle-bearing of a machine-tool or machine. Fig. 2 is a plan view, looking from the under side of the same. Figs. 3 and 4 are similar views, respectively, to Figs. 1 and 2, showing an alternative arrangement; and Figs. 5 and 6 are similar views showing another alternative arrangement.

Similar letters refer to similar parts throughout the several views.

To illustrate my invention, I have only shown the outline of part of the spindle-bearing of a machine-tool or machine, no further portion of the machine being necessary for the purpose of explanation.

Referring first to Figs. 1 and 2, $a$ is the taper spindle, fitted and free to revolve in a hole of corresponding taper in the bearing $b$ of the machine, a small portion only of the bearing being shown. In the machine-spindle $a$ is a taper hole to receive a correspondingly-tapered shank $c$ of the tool, the cutting portion of which is not shown, but which would either be attached to the screwed portion $c'$ of the shank $c$, or otherwise connected or formed in one piece with the shank $c$. A screw-thread is cut upon the reduced end of the spindle $a$, upon which is screwed a collar $d$, provided with holes $d'$ for a bar or lever, by which the collar can be turned as required. There is a central hole through the collar $d$, and this hole is threaded to correspond in size with a similar thread $c''$ cut upon the shank $c$, as shown in Fig. 1. A convenient plan of applying this collar $d$ is to screw it onto the spindle $a$. Then the shank $c$ is put into the taper hole in the spindle and screwed into the collar $d$ until the shank fits the taper hole in the spindle. The locking or driving pressure is applied by means of a lever inserted into one of the holes $d'$ to tighten the shank.

When it is desired to withdraw the shank $c$ from the machine-spindle $a$, the collar $d$ is turned slightly in the reverse direction by means of the lever, and then the shank $c$ is immediately slackened and can readily be removed by unscrewing it from the collar $d$.

In Figs. 3 and 4 the end of the machine-spindle $a$ is grooved at $a'$ in place of being screwed. The collar $d$ has a flange $d''$ partly cut away, as indicated clearly by dotted lines in Fig. 4, to allow it to be placed over the spindle $a$ in the groove $a'$. A hole is made and screw-threaded in the bottom of the collar to receive the screwed portion $c''$ of the shank $c$.

In order to secure the taper shank $c$ in the spindle $a$, the collar $d$ is put into its position on the end of the spindle. The shank c is placed in the taper hole and screwed into the collar d until it fits the taper hole, a lever being applied to a hole d' to turn the collar and draw up the shank firmly into the taper hole, as before described.

To release the taper shank c, it is only necessary to move the collar d slightly in the reverse direction.

In the alternative arrangement, Figs. 5 and 6, the spindle a is threaded at a', and the collar d also threaded, as in Figs. 1 and 2, while a recess d'' is made in the lower part of the collar to fit over a collar C'', formed upon the shank c, or, vice versa, the recess might be in the shank and the projection on the collar. In applying this arrangement the collar d is first placed upon the shank c, which is then thrust into the taper hole in the machine-spindle a. The threaded portion of the collar d engages with the thread a' until the two cones fit, when a lever is applied to one of the holes d' to turn the collar d and draw up the shank c until it is firmly secured in the spindle a.

In the constructions shown in Figs. 3 to 6 the tool is held from slipping in the spindle, when in use, by the tightness with which the collar wedges it into the taper hole.

To release and remove the shank c, the movement of the collar d is reversed to unscrew it from the spindle a, when the shank is set at liberty.

Having now particularly described and ascertained the nature of my said invention and in what manner the same is to be performed, I declare that what I claim, and desire to secure by Letters Patent of the United States, is—

1. A tool holding and releasing appliance consisting of the combination, with a spindle and shank adapted to fit each other and one of which is provided with a screw-thread, of a collar d, having a corresponding screw-thread fitting the said threaded part, said collar also engaging the other of said parts, substantially as set forth.

2. A tool holding and releasing appliance consisting of the combination of a spindle a, having a tapered hole, a shank c, correspondingly tapered, and a collar d, engaging both of said parts and adapted to force the shank longitudinally into said hole, substantially as set forth.

3. The combination of a spindle having a hole and a screw-thread a', a shank having a thread c'', and a collar having screw-threads adapted to engage said threads of the spindle and shank to move the latter longitudinally, substantially as set forth.

In testimony that I claim the foregoing as my invention I have signed my name, in presence of two witnesses, this 5th day of March, 1890.

ALFRED MUIR.

Witnesses:
S. W. GILLETT,
HERBT ROWLAND ABBEY.